United States Patent [19]

Matczak et al.

[11] Patent Number: 5,069,571
[45] Date of Patent: Dec. 3, 1991

[54] ROD END ASSEMBLY

[75] Inventors: Joseph A. Matczak, Talcottville; Stanley E. Matczak, Ellington, both of Conn.

[73] Assignee: Seals-It, Inc., East Hartford, Conn.

[21] Appl. No.: 476,154

[22] Filed: Feb. 7, 1990

[51] Int. Cl.⁵ .............................................. F16C 11/00
[52] U.S. Cl. ..................................... 403/134; 403/51; 403/131; 277/212 FB
[58] Field of Search .......................... 403/134, 131, 51; 277/212 FB

[56] References Cited

U.S. PATENT DOCUMENTS

| 1,020,738 | 7/1991 | Bauer. | |
|---|---|---|---|
| 1,567,649 | 12/1925 | Hultgren et al. | |
| 2,053,583 | 9/1936 | Summers | 403/131 |
| 2,828,984 | 4/1958 | Chow | 287/90 |
| 2,908,507 | 9/1959 | Blanks, Sr. et al. | 280/95 |
| 3,030,134 | 4/1962 | Gair | 403/134 X |
| 3,441,299 | 4/1969 | Pfaar | 403/131 |
| 3,519,279 | 6/1970 | Wagner | 277/166 |
| 3,572,414 | 3/1971 | Onufer | 151/19 |
| 3,585,894 | 6/1971 | Brown | 85/41 |
| 3,803,793 | 4/1974 | Dahl | 52/758 F |
| 4,019,550 | 4/1977 | DeHaitre | 151/7 |

Primary Examiner—Andrew V. Kundrat
Attorney, Agent, or Firm—Ira S. Dorman

[57] ABSTRACT

A spherical rod end assembly includes sealing components, each having a flexible, resilient skirt, integrally formed on a metal body, which overlies and seals the cavity within which the ball of the assembly is seated, to exclude dirt and other foreign matter. The sealing component may take the form of fasteners or washers, or combinations thereof.

19 Claims, 3 Drawing Sheets

U.S. Patent    Dec. 3, 1991    Sheet 1 of 3    5,069,571
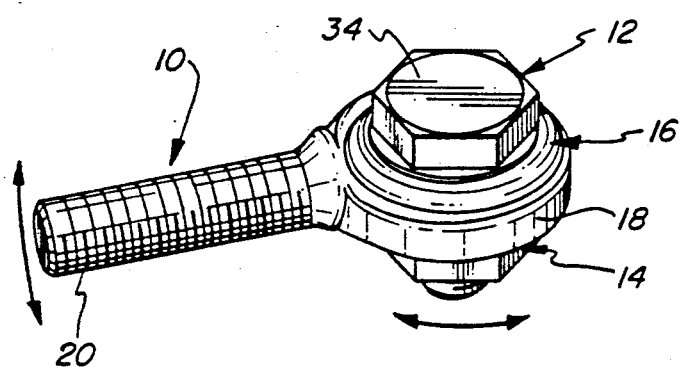
FIG. 1
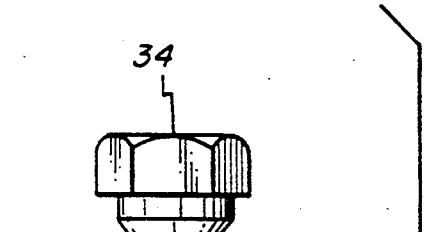
FIG. 2
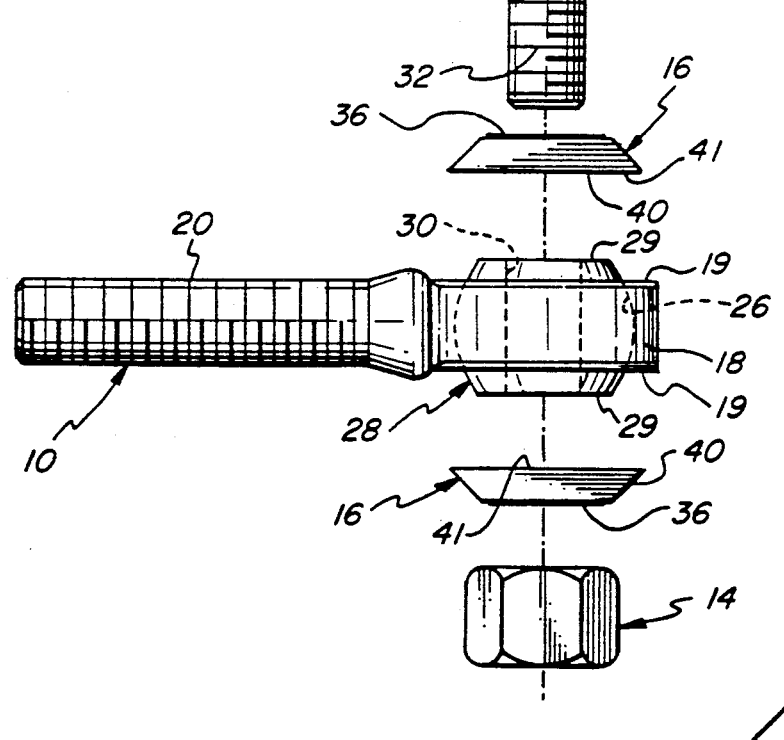

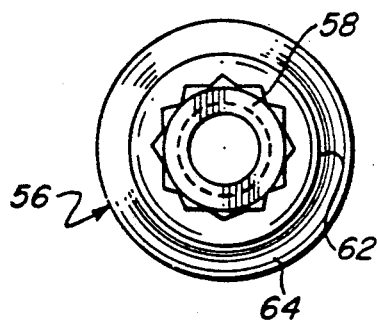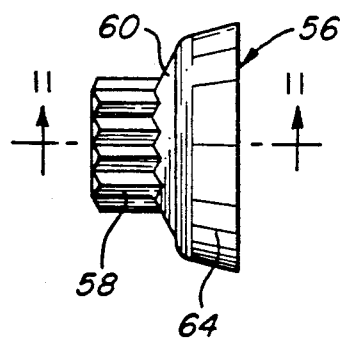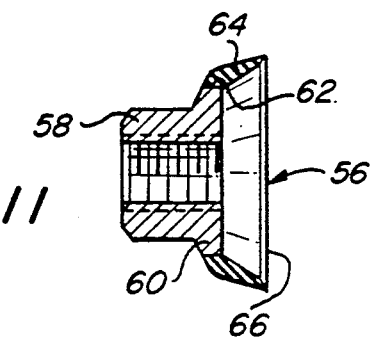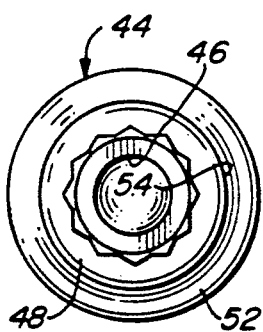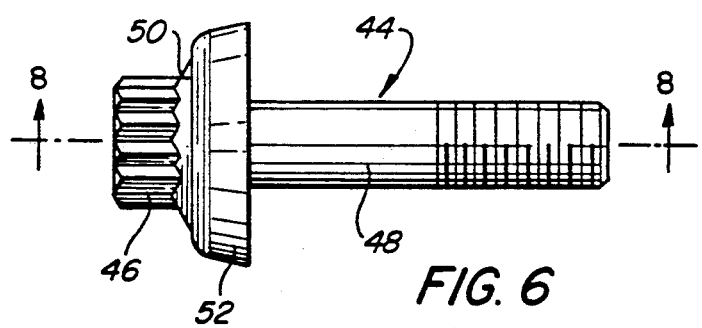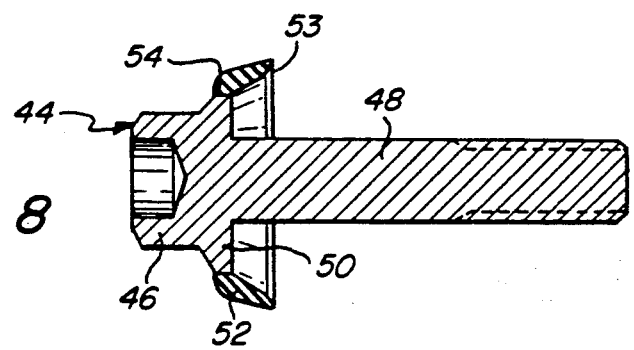

5,069,571

ROD END ASSEMBLY

BACKGROUND OF THE INVENTION

Spherical rod end assemblies are extensively used for a wide variety of applications, such as in steering linkages for land vehicles, in aircraft surface controls, in automatic door control mechanisms, and in numerous other mechanical, hydraulic and pneumatic systems. Unless effectively sealed, dirt and other foreign matter invariably deposits within the ball-seating cavities of such assemblies, causing excessive wear of components and poor performance.

Elements made of rubbery materials have in the past been used in assembly with nuts, bolts and washers, to seal thread joints and to prevent loosening of engaged components. Disclosures of that kind are found in the following U.S. patents: Hultgren et al U.S. Pat. No. 1,567,649, Wagner U.S. Pat. No. 3,519,279, Onufer U.S. Pat. No. 3,572,414, Brown U.S. Pat. No. 3,585,894, Dahl U.S. Pat. No. 3,803,793, and DeHaitre U.S. Pat. No. 4,019,550. In addition, Blanks, Sr., et al U.S. Pat. No. 2,908,507 appears to show an element overlying the socket of a tie rod body portion and extending about the steering arm pin seated therein (see FIGS. 2 and 3). U.S. Pat. No. 2,828,984, to Ho Chow, employs protective elastic sleeves to seal linkage joints against dust and lubricant loss.

Despite the activity in the art indicated by the foregoing, a need remains for simple and inexpensive means by which the ball-seating socket of a spherical rod end assembly can be effectively sealed against the entry of foreign matter. Accordingly, it is the object of the present invention to provide a spherical rod end assembly in which that need is satisfied.

It is a more specific object of the invention to provide simple and inexpensive sealing components which may readily be employed in a spherical rod end assembly to afford such protection in a highly convenient and effective manner.

SUMMARY OF THE INVENTION

It has now been found that the foregoing and related objects of the invention are attained by the provision of an assembly comprising a spherical rod end having a head portion with an opening of spheric cross section therewithin, a ball pivotably seated within the opening of the head portion, and fastener means comprised of a plurality of components. A first component of the fastener means has a shank portion extending through a bore in the ball, and a second component is engaged on the shank portion of the first. One component (be it the "first" or "second," or a third component) of the fastener means, disposed on each side of the rod end portion, is comprised of a rigid body element and an integral, annular sealing element of tough, resilient, flexible material. An inner edge portion of the sealing element continuously surrounds the peripheral marginal portion of the body element, and is sealingly bonded to it. The sealing element has an outwardly directed wall portion, which is preferably of flared, generally frustoconical configuration, terminating at an outer circumferential lip, the lip being in sealing engagement with the exterior surface of the head portion to which it is adjacent, surrounding the opening therein.

In preferred embodiments, the wall portion of the sealing element will be of diminishing thickness in the outward direction, and the lip thereon will have a terminal edge formed with a slight inward bevel to provide a sealing contact surface. When the "one" component comprises a bolt, its threaded shaft provides the shank portion of the "first" component of the fastener means, and its head provides the rigid body element of the "one" component. When the "one" component comprises a nut, it provides the "second" component of the fastener means and constitutes the requisite body element.

The fastener means will, in certain embodiments, additionally include one or two washers disposed on the shank of the "first" component, directly adjacent either or both of the exterior surfaces of the rod end head portion; the washer(s) will thus provide the "one" component(s) of the fastener means, and will constitute the rigid body element thereof. Regardless of the form of the "one" component, the body thereof will normally be fabricated from metal, with the sealing element being molded upon it; an adhesion-promoting substance may advantageously be applied to the marginal portion of the metal body to enhance the strength of the bond.

BRIEF DESCRIPTION OF THE DRAWINGS

FIG. 1 is a perspective view showing a spherical rod end assembly embodying the present invention;

FIG. 2 is an exploded elevational view of the assembly of FIG. 1;

FIG. 6 is an elevational view of a bolt suitable for use as a component of the assembly of the invention;

FIG. 7 is a left-end elevational view of the bolt of FIG. 6;

FIG. 8 is a sectional view of the bolt, taken along line 8—8 of FIG. 6;

FIG. 9 is an elevational view of a nut suitable for use as a component of the apparatus or assembly of the invention;

FIG. 10 is a left-end elevational view of the nut of FIG. 9; and

FIG. 11 is a sectional view of the nut taken along line 11—11 of FIG. 9.

DETAILED DESCRIPTION OF THE ILLUSTRATED EMBODIMENTS

Figure 5:
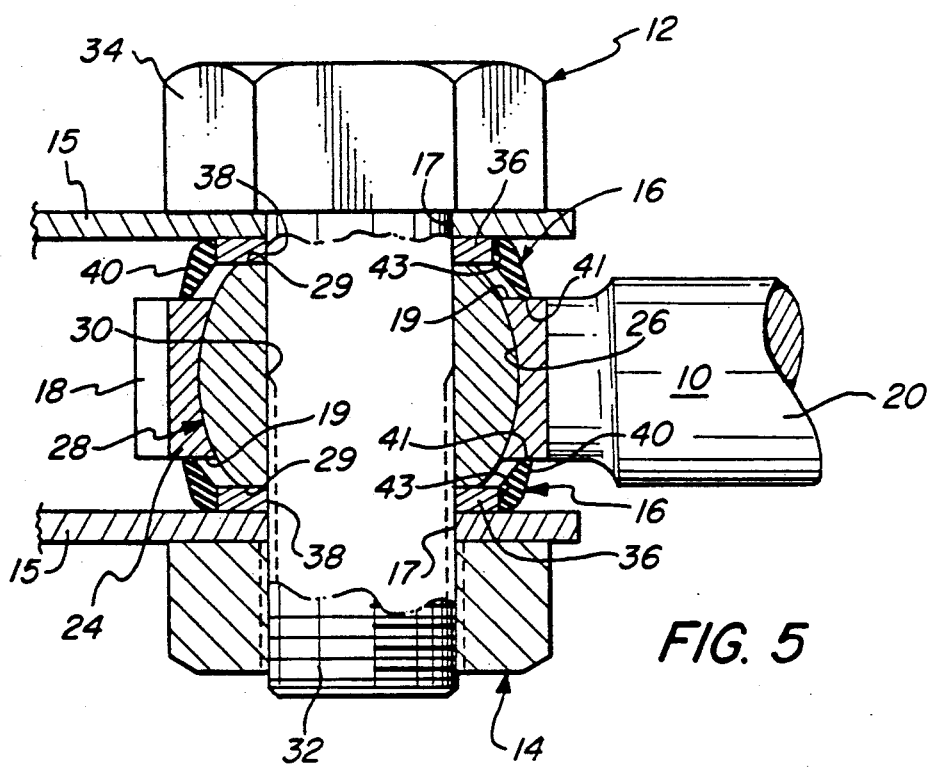
FIG. 5 is a fragmentary sectional view showing the assembly of the invention mounted on a supporting part.
Figure 3:
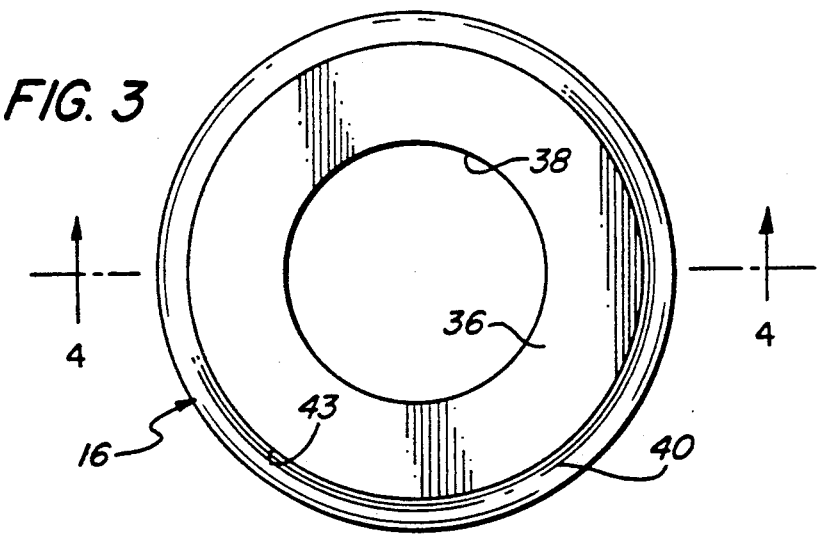
FIG. 3 is a plan view of a sealing washer utilized as a component of the assembly of the foregoing Figures, drawn to an enlarged scale.
Figure 4:
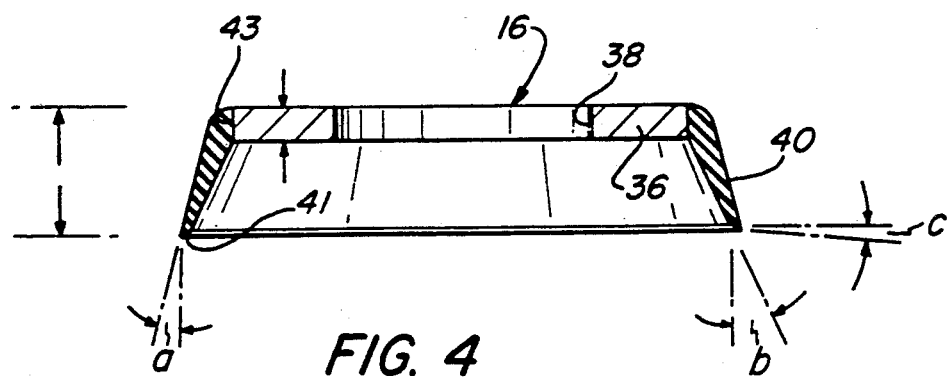
FIG. 4 is a sectional view of the sealing washer of FIG. 3, taken along line 4—4 thereof.

Turning first in detail to FIGS. 1–5 of the appended drawings, therein illustrated is a spherical rod end assembly embodying the present invention, including a spherical rod end, a bolt, a nut and a pair of sealing washers, generally designated respectively by the numerals 10, 12, 14 and 16. The rod end 10 consists of a head portion 18 and a threaded shank portion 20, the head portion 18 having an integral insert 24 (FIG. 5) affixed thereon, providing an opening 26 defined by a spheric wall surface. A truncated ball, generally designated by the numeral 28, is rotatably and pivotably seated within the opening 26, and has a diametric bore 30 through which extends the threaded shaft 32 of the bolt 12. Each of the sealing washer components 16 consists of a metal washer 36 and a flared, frustoconical skirt element 40. One washer component 16 is disposed at each end of the ball 28, under the nut 14 and the head 34 of the bolt 12, respectively, lying directly upon the flat truncating surface 29 with its hole 38 aligned with the bore 30 thereof.

As shown in FIG. 5, the assembly is mounted between spaced flanges 15 of a fragmentary illustrated supporting part (e.g., a clevis), the flanges 15 having apertures 17 through which pass the shaft 32 of the bolt 12. The washer components 16 are oriented with their sealing skirts 40 directed inwardly, causing the terminal edge 41 of the circumferential lip portions thereof to bear upon the surfaces 19 of the head portion 18 adjacent thereto, surrounding the opening 26. With the nut 14 tightened upon the bolt 12, the washer components 16 are urged inwardly, thus bringing the lip portions thereof into intimate sealing engagement with the surfaces 19.

As can be seen, the skirt elements 40 taper outwardly, typically at an angle of approximately 15°. Taken with reference to a vertical axis through the hole 38 of the washer 36, the exterior surface of the element 40 may therefore desirably be disposed at an angle "a" of 15° with the interior surface forming an angle "b" of 30° therewith. Such a construction will promote flexibility of the lip portion, while permitting the inner end portion, at which the skirt element joins the peripheral edge 43 of the washer 36, to be relatively heavy and inflexible; these features will afford durability, coupled with most effective performance.

As can also be seen, the edge surface 41 on the lip portion will advantageously be inwardly bevelled, typically at an angle "c" of approximately 5° to a plane parallel to that of the washer 36. This will help to ensure effective sealing upon the adjacent surface of the rod end, despite the distortion and movement that occurs when the ball 28 swivels within the head portion, as is of course its essential function. The edge bevel also helps to ensure that a close fit is maintained with contoured surfaces, which frequently surround such socket openings.

The sealing component will usually be fabricated by molding the skirt element directly upon an edge of the metal body, which will advantageously constitute (as does the washer 36), or provide, a circumferential flange portion. To ensure a tight and strong bond with the elastomeric material, the edge 43 of the washer will desirably be roughened. In the especially preferred embodiments, moreover, the edge 43 will carry an agent to increase adhesion, the choice of which will depend upon the composition of the material used to produce the skirt element itself.

It will be appreciated that the rod end assembly of the invention may be employed in either a double shear (as illustrated) or a single shear installation, and that a nut or a bolt, having an integral sealing element, may thus be suitable for use herein. FIGS. 6-8 illustrate such a bolt component, generally designated by the numeral 44. It has a 12-point head 46 at one end, a threaded shaft 48 at the other, and a skirt element 52 bonded to the rim of the flange 50 extending about its head 46. In a manner similar to that described with respect to the embodiment of FIGS. 1-5, the edge surface 54 of the flange 50 on the bolt head may be prepared to promote maximum bond strength; also, the lip portion of the skirt 52 is formed with a bevel 53, to best accommodate movement and non-planar contact surfaces.

Turning finally to FIGS. 9-11 of the drawings, the illustrated sealing nut component, generally designated by the numeral 56, consists of a 12-point nut 58 having a circumferential flange 60, to the edge 62 of which a sealing skirt 64 is bonded. Here again, the element 64 has an outer beveled edge surface 66, for the purposes indicated.

It will be appreciated that the components of which the assembly of the invention is comprised will normally be made of metal (e.g., steel, aluminum, brass, etc.), except of course for the sealing skirt element. As to the latter, any suitable natural rubber or synthetic polymer may be employed; neoprene rubber, polyurethanes, styrene/butadiene rubbers, nitrile elastomers, and silicone resins might be mentioned as typical, but the selection of a suitable material for any given application will be evident to those skilled in the art. In addition to providing the requisite flexibility, resiliency and durability under the variety of conditions to which the rod end assembly might be exposed, the material from which the skirt element is formed must be capable of producing a rubber-tearing bond with the metal element. As indicated above, that may be promoted by the use of an adhesive, a bonding agent, a chemical surface activator, or the like (the choice of which will also be evident to those skilled in the art), as well as by roughening of the surface of the component to which the rubber is to be bonded (e.g., by sand-blasting or the equivalent), or by other means. Normally, the sealing component will be integrally formed by molding of the elastomeric material directly to the metal piece, as by a compression, injection or transfer molding technique; bonding of preformed, separate skirt elements may however also be feasible.

Thus, it can be seen that the present invention provides simple and inexpensive means by which the ball-seating socket of a spherical rod end assembly can be effectively sealed against the entry of foreign matter. It also provides simple and inexpensive sealing components that are suitable for use in a spherical rod end assembly, to afford such protection in a convenient and highly effective manner.

Having thus described the invention, what is claimed is:

1. A spherical rod end assembly comprising: a spherical rod end having a head portion with an opening of spheric cross section therewithin, and with exterior surfaces on opposite sides of said head portion surrounding said opening; a ball pivotably seated within said opening of said rod end head portion, said ball having a bore therethrough; and fastener means comprised of a plurality of components, a first of said components of said fastener means having a shank portion extending through said bore of said ball, and a second of said components being engaged on said shank portion of said first component, one component of said fastener means on at least one of said sides of said rod end portion being comprised of a rigid body element with a peripheral marginal portion, and an integral, generally annular sealing element of tough, flexible, resilient material, said rigid body element being held by said fastener means against said ball, and said sealing element having an inner portion continuously surrounding said marginal portion of said body element and sealingly affixed thereto, said sealing element also having a wall portion extending from about said inner portion, and terminating at a flexible outer circumferential lip in movable, sealing engagement with said exterior surface of said head portion adjacent thereto.

2. The assembly of claim 1 wherein said wall portion of said sealing element is of outwardly flared generally frustoconical configuration.

3. The assembly of claim 2 wherein said wall portion is of continuously diminishing thickness in the outward direction.

4. The assembly of claim 1 wherein said lip of said wall portion has a terminal edge formed with a slight inward bevel to provide a contact surface for such sealing engagement.

5. The assembly of claim 1 wherein said one component is a bolt having a head and a threaded shaft, said bolt providing said first component of said fastener means, with said head providing said rigid body element of said one component.

6. The assembly of claim 1 wherein said one component is a nut, said nut providing said second component and constituting said rigid body element of said one component.

7. The assembly of claim 1 wherein said fastener means additionally includes at least one washer disposed on said shank of said first component directly adjacent said adjacent exterior surface of said rod end head portion, said washer providing said one component of said fastener means on said one of said sides of said rod end portion, and constituting said rigid body element thereof.

8. The assembly of claim 7 wherein said fastener means includes two of said washers, one of said washers providing said one component on both of said sides of said head portion.

9. The assembly of claim 1 wherein said body of said one component is fabricated from metal, and wherein said sealing element is molded upon said body.

10. The assembly of claim 9 wherein said body of said one component has an adhesion-promoting substance carried on said marginal portion thereof for enhancement of the level of bond strength of said sealing element thereto.

11. The assembly of claim 9 wherein said body of said one component includes a circumferential flange portion providing said marginal portion.

12. A spherical rod end assembly comprising: a spherical rod end having a head portion with an opening of spheric cross section therewithin, and with exterior surfaces on opposite sides of said head portion surrounding said opening; a ball pivotably seated within said opening of said rod end head portion, said ball having a bore therethrough; and fastener means comprised of a plurality of components, a first of said components of said fastener means having a shank portion extending through said bore of said ball, and a second of said components being engaged on said shank portion of said first component, one component of said fastener means on each of said sides of said rod end portion being comprised of a rigid body element with a peripheral marginal portion, and an integral, generally annular sealing element of tough, flexible, resilient material molded upon said rigid body element, said sealing element having an inner portion continuously surrounding said marginal portion of said body element and sealingly bonded thereto, and having an outwardly flared, generally frustoconical wall portion extending from about said inner portion, said wall portion terminating at a flexible outer circumferential lip in movable sealing engagement with said exterior surface of said head portion adjacent thereto.

13. The assembly of claim 12 wherein said wall portion is of continuously diminishing thickness in the outward direction.

14. The assembly of claim 12 wherein said lip of said wall portion has a terminal edge formed with a slight inward bevel to provide a contact surface for such sealing engagement.

15. The assembly of claim 12 wherein said body of said one component is fabricated from metal.

16. The assembly of claim 15 wherein said body of said one component has an adhesion-promoting substance carried on said marginal portion thereof for enhancement of the level of bond strength of said sealing element thereto.

17. A spherical rod end assembly comprising: a spherical rod end having a head portion with an opening of spheric cross section therewithin, and with exterior surfaces on opposite sides of said head portion surrounding said opening; a ball pivotably seated within said opening of said rod end head potion, said ball having a bore therethrough; and fastener means comprised of a plurality of components, a first of said components of said fastener means having a shank portion extending through said bore of said ball, and a second of said components being engaged on said shank portion of said first comment, at least one component of said fastener means being comprised of a rigid body element with a peripheral marginal portion, and an integral, generally annular sealing element of tough, flexible, resilient material, said sealing element having an inner portion continuously surrounding said marginal portion of said body element and sealingly affixed thereto, and having a wall portion extending from bout said inner portion, said wall portion terminating at a flexible outer circumferential lip in movable sealing engagement with said exterior surface of said head portion adjacent thereto, said rigid body of said one component being provided by a washer disposed on said shank of said first component directly adjacent one of said exterior surfaces of said rod end head portion, and said sealing element thereof being in the form of a flared, frustoconical skirt element.

18. The assembly of claim 17 wherein said skirt element has an interior surface forming an angle of 30° with reference to an axis through the hole of said washer.

19. The assembly of claim 18 wherein said washer is fabricated from metal.

* * * * *